United States Patent [19]
Unami et al.

[11] Patent Number: 5,696,663
[45] Date of Patent: Dec. 9, 1997

[54] CAPACITOR HAVING A BAND OF ZINC AND AN ALUMINUM FILM FORMED ON A PLASTIC FILM

[75] Inventors: Kiyoshi Unami, Himi; Hidekazu Wada, Tonami; Nobuji Suzuki, Takaoka; Masanori Tsuda, Tonami, all of Japan

[73] Assignee: Matsushita Electric Industrial Co., Ltd., Osaka-fu, Japan

[21] Appl. No.: 724,098

[22] Filed: Sep. 30, 1996

[30] Foreign Application Priority Data

Oct. 6, 1995 [JP] Japan .................. HEI 7-260130

[51] Int. Cl.$^6$ .......................... H01G 4/015; H01G 4/008; H01G 4/32; H01G 4/08
[52] U.S. Cl. .................. 361/305; 361/273; 361/303; 361/301.5; 361/309; 361/323
[58] Field of Search .................. 361/303–305, 361/309, 323, 273; 29/25.42

[56] References Cited

U.S. PATENT DOCUMENTS

| 4,477,858 | 10/1984 | Steiner ........................ 361/273 |
| 4,819,127 | 4/1989 | Gizolme et al. .................. 361/273 |
| 5,610,796 | 3/1997 | Lavene ........................ 361/303 |

*Primary Examiner*—Bot L. Ledynh
*Attorney, Agent, or Firm*—Panitch Schwarze Jacobs & Nadel, P.C.

[57] ABSTRACT

A capacitor has a plastic film (4a, 4b), an aluminum deposition film (5a, 5b) formed on the plastic film (4a, 4b), and a zinc deposition film (6a, 6b) formed on the aluminum deposition film (5a, 5b) over the side of one edge part of the plastic film (4a, 4b).

4 Claims, 16 Drawing Sheets

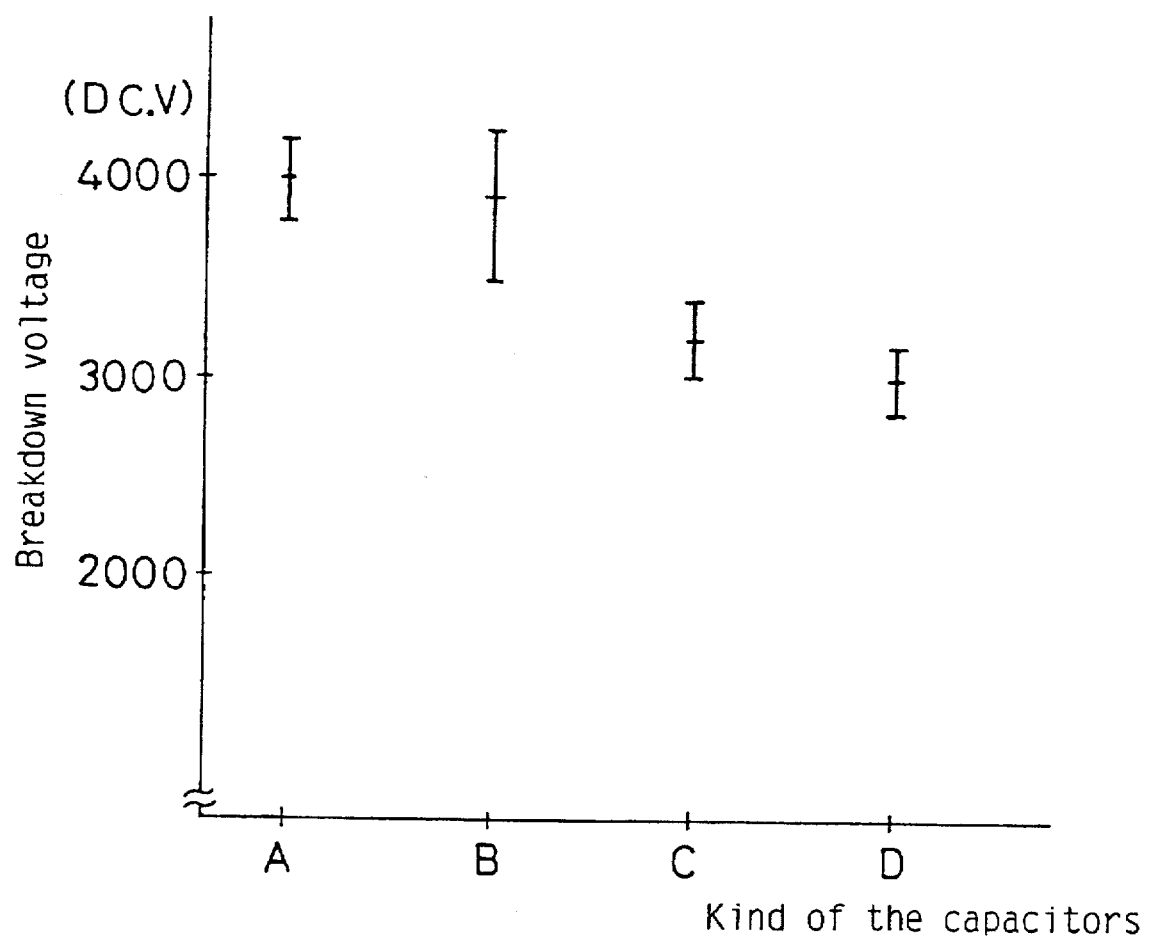

F I G. 8A
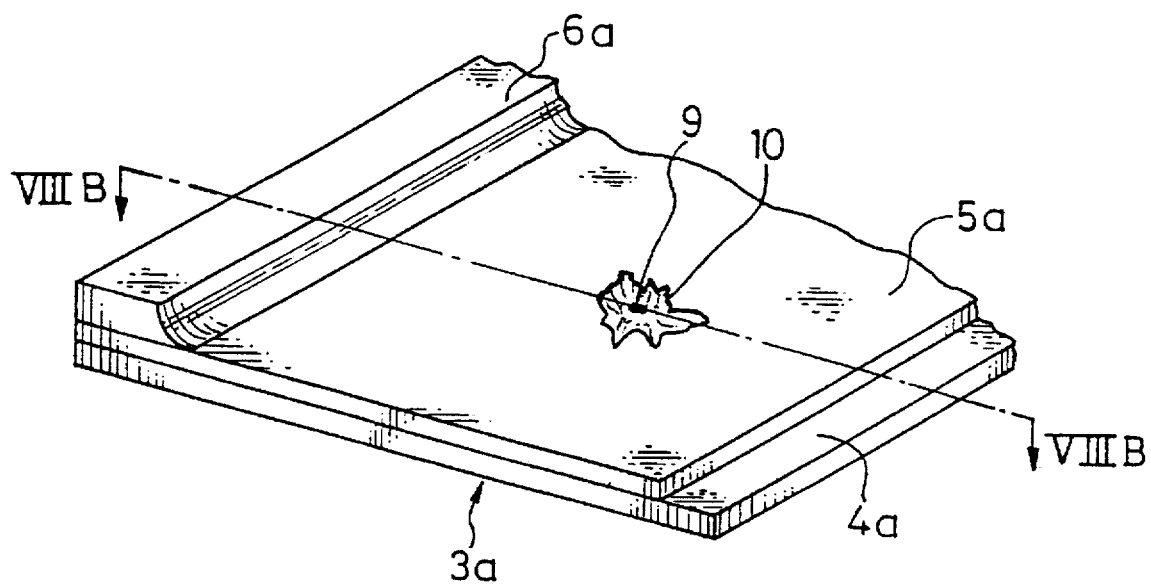
F I G. 8B
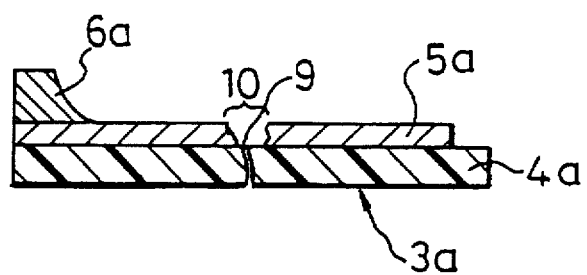

CAPACITOR HAVING A BAND OF ZINC AND AN ALUMINUM FILM FORMED ON A PLASTIC FILM

FIELD OF THE INVENTION AND RELATED ART STATEMENT

1. Field of the Invention

This invention relates to a capacitor, which is used as a power capacitor and the like, for charging and discharging energy.

2. Description of the Related Art Statement

A capacitor for charging and discharging energy is used for an impulse voltage generator and/or an impulse current generator in an electric power supply for a flash lamp and the like. Furthermore, the capacitor is used in a test apparatus such as an impulse test apparatus to detect dielectric strength of an electric power apparatus to ground.

A conventional capacitor comprises a casing equipped with two electrode terminals, and at least one capacitor element contained and sealed in the casing. According to a demanded voltage and/or a demanded capacitance, a plurality of the capacitor element are connected in series, or in parallel in the casing. The capacitor element is configured by winding two sheet-shaped dielectric members and two sheet-shaped electrode members. Each of the dielectric members is formed by a paper, a plastic film, or a composite film comprising paper and plastic film. Each of the electrode members is configured by an aluminum foil, or a metallized paper whereon a metal such as zinc is deposited.

Furthermore, in the conventional capacitor, it is known that a metallized film is used for the capacitor element in order to attain small size and light weight. The metallized film is constituted with the plastic film and a metal deposition film deposited on the plastic film. The plastic film serves as a dielectric member, and the metal deposition film serves as electrode members.

Recently, the aforementioned electric power supply and test apparatus are required to attain small size and light weight, and thereby, the capacitor therein is also required to further attain small size and light weight. Since most of volume of the conventional capacitor is occupied with that of the capacitor element configured by winding two sheet-shaped metallized films, it is necessary that size of the capacitor element should become small. Concretely, it is necessary to decrease thickness of the plastic film. In other words, an electric potential gradient of the plastic film becomes large.

In the conventional capacitor, there is a difficulty to thin thickness of the plastic film. This is because, if thickness of the plastic film becomes thin, both a voltage proof characteristic and a life characteristic are deteriorated.

In order to overcome the difficulty, various improvements were proposed in order to increase the voltage proof characteristic and the life characteristic with a thinner plastic film.

Among one of the various improvements it is known to provide a heavy edge construction to the metal deposition film for performing self-healing. That is, a band shaped thick step portion is formed along one edge part of the metal deposition film, so that thickness of the rest part other than the band shaped step portion of the metal deposition film becomes very thin. The one edge part including the step portion will come in contact with a metallikon part, which is to be connected with one of the two electrode terminals.

In the capacitor, an aluminum deposition film has a preferable self-healing due to the property of dispersion generally. That is, in the aluminum deposition film, a smaller aperture is formed by the self-healing. Therefore, decay of capacitance is small caused by the self-healing.

On the contrary, in a zinc deposition film, when the self-healing is performed, an aperture becomes larger in comparison with that of the aluminum deposition film. Therefore, decay of capacitance is large.

By this heavy edge construction, the electric potential gradient of the plastic film is improved in accordance with the self-healing. It is known that the mechanism of the self-healing is described in the following lines;

(1) An insulation defect portion is generally produced in the plastic film by an air bubble existing in the plastic film. When voltage is given across the two metal deposition films, a short-circuit current flows across the two metal deposition films at the insulation defect portion.

(2) Thereby, a part of the metal deposition film adjacent to the insulation defect portion is dispersed and evaporated by heat of the short-circuit current. As a result, dielectric strength of the insulation defect portion is healed by disappearance of the part of the metal deposition film adjacent to the insulation defect portion.

When the self-healing is performed incompletely, dielectric strength of the capacitor is defined by the dielectric strength of the insulation defect portion. In the case that the self-healing is performed completely, the dielectric strength of the capacitor is equal to an inherent dielectric strength of the plastic film. That is, when the self-healing is performed completely, it is possible to increase the electric potential gradient of the plastic film in comparison with the case that the self-healing is performed incompletely.

The self-healing is performed effectively under the following condition (1) and (2):

(1) Thickness of the metal deposition film becomes thin, so that the metal deposition film is dispersed and evaporated easily, and (2) The short-circuit current is reduced.

In the heavy edge construction of the conventional capacitor having metallized films each having zinc deposition film with band shaped portion and the conventional capacitor having metallized films each having aluminum deposition film with band shaped step portion, thicknesses of the metal deposition films become thinner than that of the step portion. Especially in case of zinc deposition film, as will be described later, the ability of self-healing is improved. Furthermore, in the heavy edge construction of the conventional capacitor, the step portion is formed on one edge part of the metal deposition film. It is intended to improve thereby a property of connection between the metal deposition film and the metallikon part.

In the conventional capacitor of the heavy edge construction, zinc was used for the metal deposition film generally, but aluminum is hardly used for the metal deposition film. The reason why is that when using only aluminum, the step portion can not be formed sufficiently thick on the metal deposition film as that formed with zinc. When the step portion on the metal deposition film is formed by aluminum only, because of the poor thickness of the step portion there is a fear that the reliability of connection between the metal deposition film and the metallikon part is deteriorated in a short time. Thereby, there is a problem that an allowable maximum charging and discharging current of the capacitor is limited to a small value.

Furthermore, in the heavy edge construction of the conventional capacitor, even if zinc is used for the metal deposition film as well as the step portion, it was difficult to form such small thickness as to improve the self-healing ability of the metal deposition film. Therefore, in the conventional capacitor, there is problems that it is impossible to increase the electric potential gradient, and to attain small size.

OBJECT AND SUMMARY OF THE INVENTION

The object of the present invention is to provide a capacitor that can solve the aforementioned problems.

In order to achieve the above-mentioned object, a capacitor in accordance with the present invention comprises:

a together-wound roll of two oblong metallized films, with the metallized films overlapping each other, each of the two metallized films including an oblong plastic film, an aluminum deposition film formed on the plastic film, and a band of zinc deposition film formed along an edge of the aluminum deposition film, on one of the two metallized films the band of zinc deposition film is disposed on one side edge of the oblong plastic film in widthwise direction, and on the other of the two metallized films the band of zinc deposition film is disposed on the other side edge of the oblong plastic film in the widthwise direction.

The capacitor in accordance with the present invention has two metallized films of aluminum deposition films deposited on both faces of the plastic films as the main electrode part. Furthermore, on one edge part of each of the plastic film, a band shaped zinc deposition film is formed, so that the heavy edge construction is formed with the zinc deposition film on the aluminum deposition film. Thereby, the self-healing is appropriately performed, and size of the self-healing part become small. As a result, each of dielectric strength of the plastic films is able to be recovered the inherent dielectric strength. Furthermore, it is possible to increase the electric potential gradient. Moreover, since the zinc deposition films are used in the heavy edge construction, it is possible to increase allowable maximum of current. As a result, in the capacitor of the present invention, it is possible to obtain the capacitor having superior life characteristic with smell size and light weight.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 7 is a graph showing test results of a breakdown test in a Comparative Investigation 1.

FIG. 8A is a perspective view showing the metallized film of the first embodiment after the breakdown test.

FIG. 8B is a cross sectional view, which is taken on line IIIVB—IIIVB of FIG. 8A, showing the metallized film of the first embodiment after the breakdown test.

It will be recognized that some or all of the Figures are schematic representations for purposes of illustration and do not necessarily depict the actual relative sizes or locations of the elements shown.

DESCRIPTION OF THE PREFERRED EMBODIMENT

Hereafter, preferred embodiments of the present invention are described with reference to the accompanying drawings.

<<FIRST EMBODIMENT>>

Figure 1:
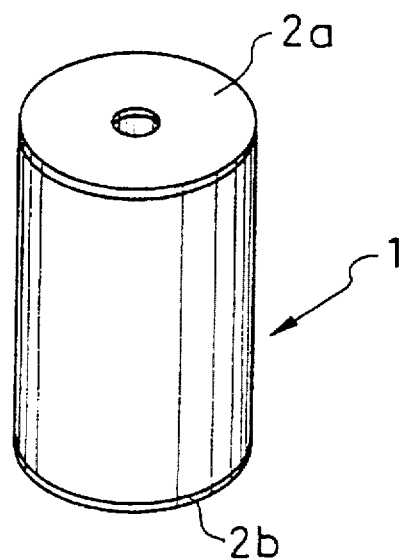
FIG. 1 is a perspective view showing a main part of a capacitor of a first embodiment of the present invention.
Figure 2:
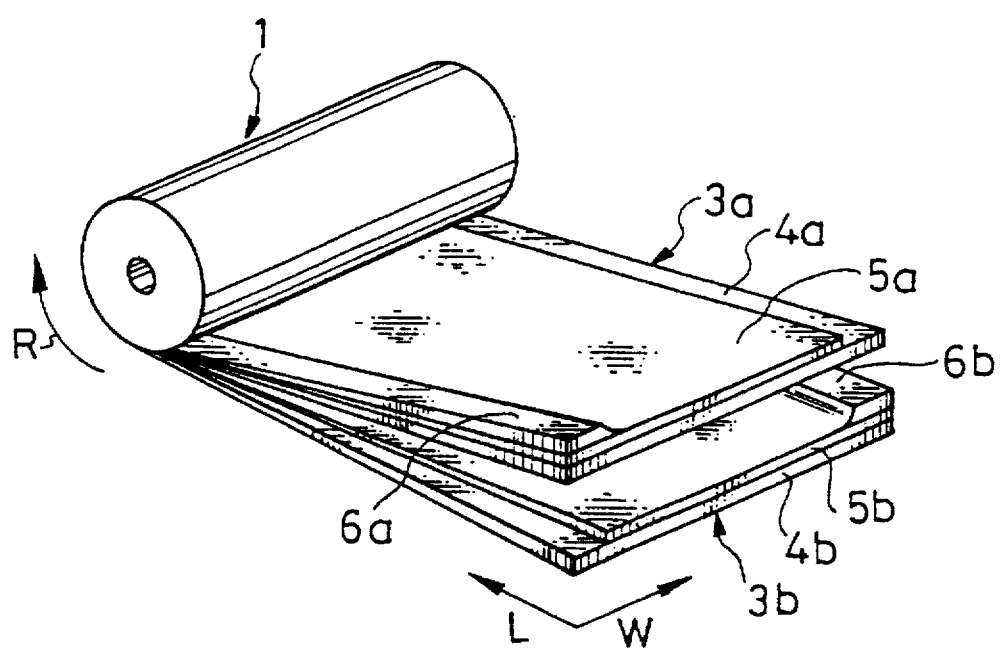
FIG. 2 is a perspective view showing a construction of a capacitor element of FIG. 1.

FIG. 1 is a perspective view showing a main part of a capacitor of a first embodiment of the present invention. FIG. 2 is a perspective view showing a construction of a capacitor element of FIG. 1. In the description of the present invention, a widthwise direction of a metallized film is shown by an arrow "W" of FIG. 2, and a lengthwise direction of the metallized film is shown by an arrow "L" of FIG. 2.

In FIG. 1 and FIG. 2, a capacitor comprises a cylinder-shaped capacitor element 1, and two metallikon parts 2a, 2b mounted on both end parts of the capacitor element 1, respectively. The capacitor element 1 and the two metallikon parts 2a, 2b are contained and sealed in a casing (not shown) formed by metal. It is known that the inside of the casing is filled with polybutene oil in order to increase insulation of the capacitor element 1 from the casing. Furthermore, the casing generally has an internal pressure detecting device such as a bellows type pressure sensor for detecting an accident of the capacitor.

The capacitor element 1 is configured by superposing a first metallized film 3a and a second metallized film 3b and then rolling the superposing films together to form a roll. The two metallikon parts 2a, 2b are formed by zinc by means of a metal .spraying method. Each of the two metallikon parts 2a, 2b are connected with an electrode terminal (not shown) equipped with the casing, so that the capacitor element 1 is connected with an external electric power apparatus.

The first metallized film 3a comprises an oblong polyethylene telephthalate film (hereinafter referred to as a PET film) 4a of about 10 μm thickness as substrate, an aluminum deposition film 5a of several hundred Å thickness deposited on one surface of the PET film 4a, and a zinc deposition film 6a of about one hundred Å thickness deposited on the aluminum deposition film 5a. Similarly, the second metallized film 3b comprises the PET film 4b, an aluminum deposition film 5b deposited on one surface of the PET film 4b, and a zinc deposition film 6b deposited on the aluminum deposition film 5b all in similar thickness. Each of the PET films 4a, 4b serves as a dielectric member, and each of the aluminum deposition films 5a, 5b and the zinc deposition films 6a, 6b serves as an electrode member.

As shown in FIG. 2, the first metallized film 3a is put on the second metallized film 3b so that the PET film 4a comes in contact with the zinc deposition film 6b. Furthermore, the first and the second metallized films 3a and 3b are wound in a rotational direction shown by an arrow "R" of FIG. 2, so that the capacitor element 1 is produced.

For example, the first metallized film 3a will be explained with reference to FIG. 3A and FIG. 3B in detail.

Figure 3A:
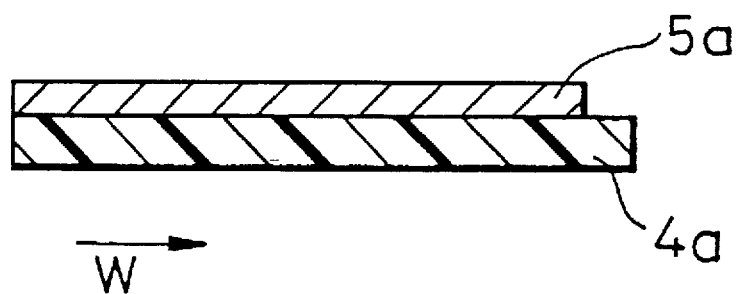
FIG. 3A is a sectional view showing a state before a zinc deposition film is formed on an aluminum deposition film in a metallized film of the first embodiment.

FIG. 3A is a sectional view showing a state before a zinc deposition film is formed on an aluminum deposition film in a metallized film of the first embodiment. FIG. 3B is a sectional view showing a state after the zinc deposition film is formed on the aluminum deposition film in the metallized film of the first embodiment. Of course, the thickness of respective films are shown exaggeratively enlarged to indicate the configuration.

As shown in FIG. 3A, the aluminum deposition film 5a is formed on one surface of the PET film 3a by a vapor deposition method with a predetermined pattern. That is, in the widthwise direction, width of the aluminum deposition film 5a is shorter than that of the PET film 4a. Therefore, when the left side edge of the aluminum deposition film 5a is connected with the metallikon part 2a (FIG. 1), it is possible to prevent contact of the right side edge of the aluminum deposition film 5a from connecting with the metallikon part 2b (FIG. 1).

Figure 3B:
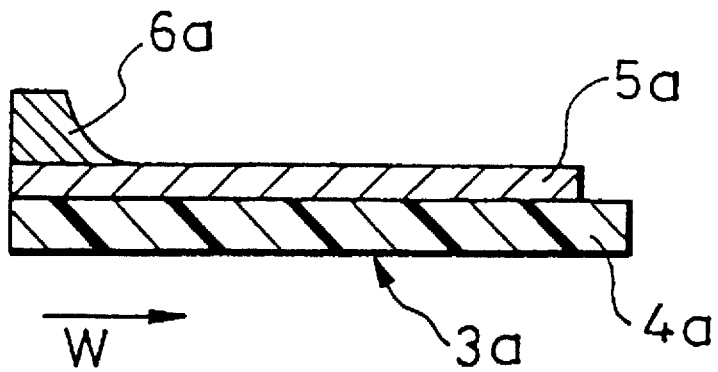
FIG. 3B is a sectional view showing a state after the zinc deposition film is formed on the aluminum deposition film in the metallized film of the first embodiment.

Subsequently, as shown in FIG. 3B, the band-shaped zinc deposition film 6a is formed on the aluminum deposition film 5a along the edge by the vapor deposition method using a mask. Thus, the zinc deposition film 6a is formed on the aluminum deposition film 5a, which has been formed on the PET film 3a. As a result, the aluminum deposition film 5a and the zinc deposition film 6a together form a heavy edge construction on the PET film 3a so that the metallikon part 2a (FIG. 1) is connected with both edge parts of the aluminum deposition film 5a and the zinc deposition film 6a.

These forming processes of the aluminum deposition film 5a and the zinc deposition film 6a are performed in a vacuum tank on the predetermined conditions, for example, under 0.001 mmHg of vacuum and 130° C.±10° C.

Apart from the aforementioned explanation, wherein the cylinder-shaped capacitor element 1 is configured by winding up the first and the second metallized films 3a, 3b together, an alternative construction may be such that the capacitor element is configured by winding the first and the second metallized films 3a, 3b into an oval. Furthermore, apart from the aforementioned explanation, wherein the dielectric member is formed by the PET films 4a, 4b, an alternative construction may be such that the dielectric member is formed by a polypropylene film, a polycarbonate film, a polystyrene film, a polyethylene film, or a composite film thereof.

<<SECOND EMBODIMENT>>

Figure 4A:
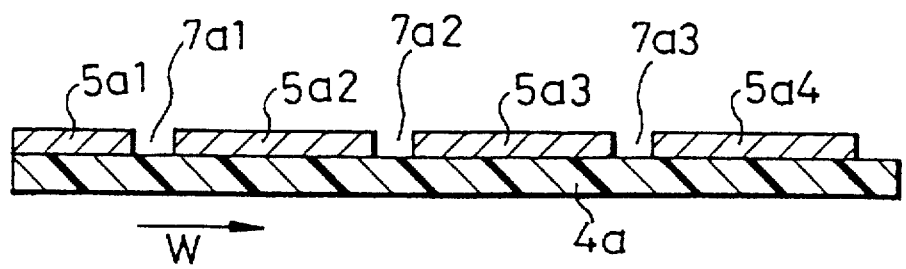
FIG. 4A is a sectional view showing a state before the zinc deposition film is formed on the aluminum deposition film in a first metallized film of a second embodiment.
Figure 4B:
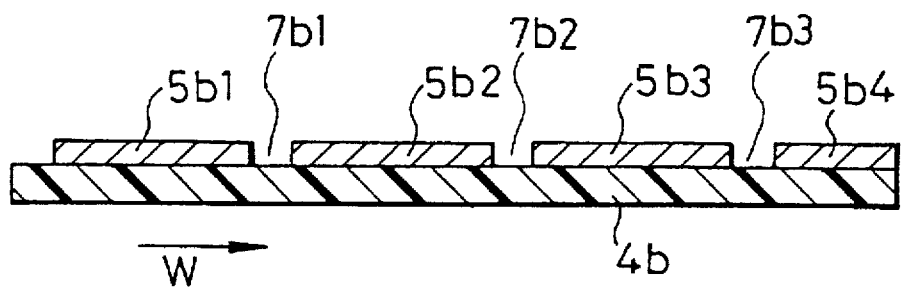
FIG. 4B is a sectional view showing a state before the zinc deposition film is formed on the aluminum deposition film in a second metallized film of the second embodiment.
Figure 4C:
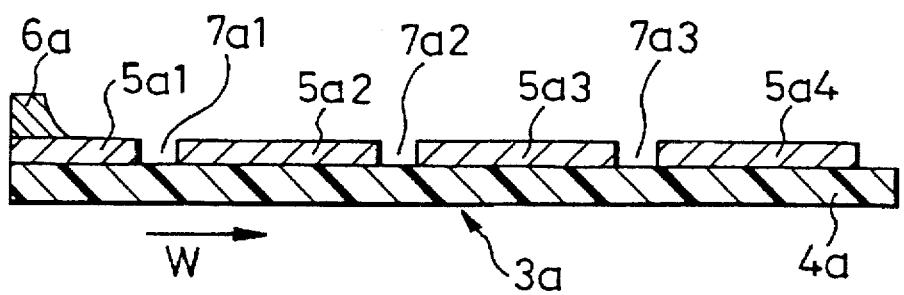
FIG. 4C is a sectional view showing a state after the zinc deposition film is formed on the aluminum deposition film in the first metallized film of the second embodiment.
Figure 4D:
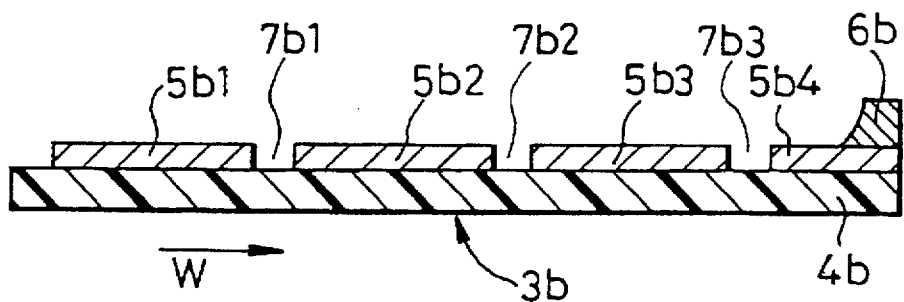
FIG. 4D is a sectional view showing a state after the zinc deposition film is formed on the aluminum deposition film in the second metallized film of the second embodiment.

FIG. 4A is a sectional view showing a state before the zinc deposition film is formed on the aluminum deposition film in a first metallized film of a second embodiment. FIG. 4B is a sectional view showing a state before the zinc deposition film is formed on the aluminum deposition film in a second metallized film of the second embodiment. FIG. 4C is a sectional view showing a state after the zinc deposition film is formed on the aluminum deposition film in the first metallized film of the second embodiment. FIG. 4D is a sectional view showing a state after the zinc deposition film is formed on the aluminum deposition film in the second metallized film of the second embodiment.

In this second embodiment, the capacitor element 1 is fundamentally the same as that of the first embodiment except for patterns of the aluminum deposition films. Therefore, corresponding parts and components to the first embodiment are shown by the same numerals and marks, and the description thereon made in the first embodiment similarly apply. In the following description, differences of this second embodiment from the first embodiment are mainly explained.

Gist of this second embodiment is to form plural (e.g., four pieces) oblong aluminum deposition films on the first and the second PET films. Furthermore, when the first metallized film is put on the second metallized film, relation between each gap formed between adjacent two of the plural aluminum deposition films on the first metallized film and each gap formed between adjacent two of the plural aluminum deposition films on the second metallized film is selected as follows. The gap on the first metallized film and the pap on the second metallized film are disposed in staggered relation. Thereby, multiple series capacitor parts are formed in the capacitor element 1.

In this second embodiment, stripes are formed on the PET film 4a by the four aluminum deposition films 5a1, 5a2, 5a3, 5a4 and three paps 7a1, 7a2, 7a3. That is, as shown in FIG. 4A, four aluminum deposition films 5a1, 5a2, 5a3, 5a4 are formed on one surface of the PET film 4a so that the four aluminum deposition films 5a1, 5a2, 5a3, 5a4 are disposed in parallel with each other in the lengthwise direction. Thereby, oblong parting three gaps 7a1, 7a2, 7a3 are formed in parallel in the lengthwise direction between adjacent two of the four aluminum deposition films 5a1, 5a2, 5a3, 5a4.

Similarly, as shown in FIG. 4B, four aluminum deposition films 5b1, 5b2, 5b3, 5b4 are formed on one surface of the PET film 4b so that the four aluminum deposition films 5b1, 5b2, 5b3, 5b4 are disposed in parallel with each other in the lengthwise direction. Thereby, oblong parting three gaps 7b1, 7b2, 7b3 are formed in parallel in the lengthwise direction between adjacent two of the four aluminum deposition films 5b1, 5b2, 5b3, 5b4.

Subsequently, as shown in FIG. 4C, the zinc deposition film 6a is formed on the aluminum deposition film 5a1, and thereby the first metallized film 3a is produced. Furthermore, the aluminum deposition film 5a1 and the zinc deposition film 6a form the heavy edge construction for contact with the metallikon part 2a (FIG. 1).

Similarly, as shown in FIG. 4D, the zinc deposition film 6b is formed on the aluminum deposition film 5b4, and thereby the second metallized film 3b is produced. Furthermore, the aluminum deposition film 5b4 and the zinc deposition film 6b form the heavy edge construction for contact with the metallikon part 2b (FIG. 1).

After the first metallized film 3a is put on the second metallized film 3b so that the three gaps 7a1, 7a2, 7a3 are not superposed over the three gaps 7b1, 7b2, 7b3, respectively, the first and the second metallized films 3a and 3b are wound together. Thereby, the capacitor element 1 (FIG. 1) is configured in multiple elements series-connected capacitors. That is, in this capacitor element 1, seven capacitors connected in series are formed between the respective aluminum deposition films 5a1, 5a2, 5a3, 5a4 and the respective aluminum deposition films 5b1, 5b2, 5b3, 5b4.

<<THIRD EMBODIMENT>>

Figure 5:
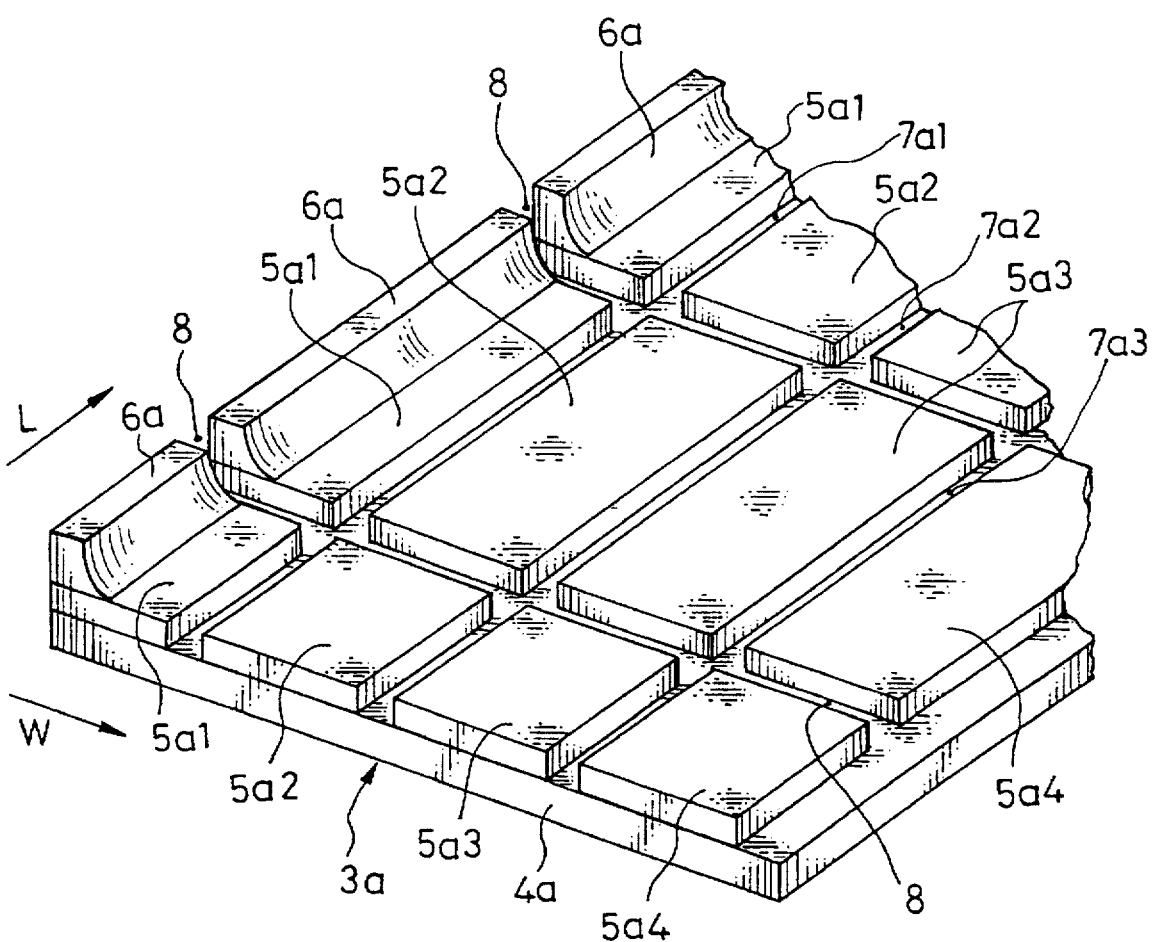
FIG. 5 is a perspective view showing a metallized film of a third embodiment.

FIG. 5 is a perspective view showing a metallized film of a third embodiment.

In this third embodiment, the capacitor element 1 has fundamentally configuration the same as that of the second embodiment, except that plural cut-out portions are formed on the plural aluminum deposition films and the zinc deposition film in parallel in the widthwise direction. Therefore, corresponding parts and components to the second embodiment are shown by the same numerals and marks, and the description thereon made in the second embodiment similarly apply. In the following description, differences of this third embodiment from the second embodiment are mainly explained.

As shown in FIG. 5, the respective four aluminum deposition films 5a1, 5a2, 5a3, 5a4 and the zinc deposition film 6a are divided into plural pieces in the lengthwise direction by plural cut-out portions 8. The plural cut-out portions 8 are formed on the PET film 4a in parallel with the widthwise direction by a laser beam machining method, a vapor deposition method using an oil, method, or the like.

In the third embodiment, the plural cut-out portions 8 are formed on at least one of the first and the second metallized films 3a and 3b of the second embodiment. Thereby, plural sets each having seven capacitors connected in series is further connected in parallel, thereby forming a capacitor element 1 of the shape of FIG. 1.

Hereafter, Comparative Investigations are shown for various combinations of the aforementioned embodiments and comparison examples.

Three comparison examples, a first comparison example, a second comparison example and a third comparison example are prepared.

Each capacitor elements of the three comparison examples will be explained in the following descriptions.

The first comparison example has the aluminum deposition film which is formed on one surface of the PET film with the pattern shown in FIG. 3A, so that production of the metallized film is completed. A resistivity of this aluminum deposition film is adjusted to 8–30 Ω per square. Subsequently, a capacitor element is formed by winding the two metallized films, and the two metallikon parts are provided on both end parts of the capacitor element, respectively.

The second comparison example has the aluminum deposition film which is formed on one surface of the PET film with the pattern shown in FIG. 3A, so that production of the metallized film is completed. A resistivity of this aluminum deposition film is adjusted to 1.5–7 Ω per square. Subsequently, a capacitor element is formed by winding the two metallized films, and the two metallikon parts are provided on both end parts of the capacitor element, respectively.

Figure 6:
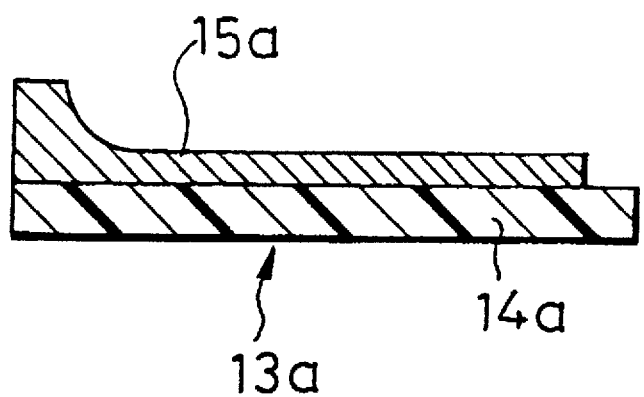
FIG. 6 is a sectional view showing a metallized film of a third comparison example.

The third comparison example has a zinc deposition film 15a having the heavy edge construction which is formed on one surface of the PET film 14a, as shown in FIG. 6, so that production of the metallized film 13a is completed. In this zinc deposition film 15a, a resistivity of a part of the heavy edge construction is adjusted to 1.5–7 Ω per square, and a resistance of a thin part except for the part of the heavy edge construction is adjusted to 8–30 Ω per square. Subsequently, a capacitor element is formed by winding the two metallized films 13a, and the two metallikon parts are provided on both end parts of the capacitor element, respectively. This capacitor element of the third comparison example is the same as the conventional capacitor element having the heavy edge construction.

<<COMPARATIVE INVESTIGATION 1>>

In a Comparative Investigation 1, the capacitor of the aforementioned first embodiment is compared with capacitors of the three comparison examples in order to show the technical advantages of the capacitor of the first embodiment. In the capacitor element 1 of the first embodiment as shown in FIG. 2, a resistivity of the respective aluminum deposition films 5a, 5b as shown in FIG. 2 is adjusted to 8–30 Ω per square. Furthermore, a resistivity of the respective zinc deposition films 6a, 6b (FIG. 2) is adjusted to 1.5–7 Ω per square.

With regard to an appearance of the metallized film, the third comparison example is similar to that of the first embodiment. However, there are differences between the first embodiment and the third comparison example as follows (1) and (2);

(1) As to a main electrode part deposited on the PET film, the metallized film of the first embodiment is formed by the aluminum deposition film 5a, 5b (FIG. 2). Contrary to the first embodiment, the main electrode part of the third comparison example is formed by the zinc deposition film 15a as shown in FIG. 6.

(2) As to the heavy edge construction, the metallized film of the first embodiment is formed by a double deposition film consisting of an aluminum deposition films 5a, 5b and the band-shaped zinc deposition films 6a, 6b (FIG. 2). Contrary to the first embodiment, the heavy edge construction of the third comparison example only is formed by the zinc deposition film 15a of FIG. 6.

In the Comparative Investigation 1, each of the capacitor elements of the first embodiment and the three comparison examples is contained in the casing equipped with the internal pressure detecting device. Each of the metallikon parts is connected with the electrode terminal, and the inside of the casing is filled with the polybutene oil. Thickness of each PET films of the first embodiment and the three comparison examples is 10 μm, and capacitance of each capacitors of the first embodiment and the three comparison examples is 30 μF.

A breakdown test result in the Comparative Investigation 1 will be elucidated with reference to FIG. 7.

FIG. 7 is a graph showing test results of a breakdown test in a Comparative Investigation 1, wherein kind of the capacitors are represented on abscissa, and the ordinate is graduated with a breakdown voltage. In the abscissa of FIG. 7, points "A", "B", "C", and "D" on abscissa designate the capacitors of the first embodiment, the first comparison example, the second comparison example, and the third comparison example, respectively.

In order to obtain average value of a breakdown voltage in the respective capacitors, the breakdown test is performed for ten capacitors. In the breakdown test, a test voltage is applied to respective capacitors, and the test voltage is increased with a predetermined rate until breakdown occurs in each capacitor.

Furthermore, test conditions in the breakdown test are as follows:

(1) Temperature is 20±15° C.
(2) Humidity is 50±20%.
(3) An increasing rate of the test voltage is 100 V per minute.

As shown in FIG. 7, the average value of the breakdown voltage in the capacitors of the first embodiment exceeds in comparison with that of the third comparison example. Concretely, difference value between the breakdown voltage of the first embodiment and that of the third comparison example is 700–1000 V. The average value of the breakdown voltage in the capacitors of the first comparison example is similar to that of the first embodiment. However, the breakdown voltage in the capacitors of the first comparison example varies more widely in comparison with that of the first embodiment. The average value of the breakdown voltage in the capacitors of the second comparison example is inferior to those of the first embodiment and the first comparison example, and is superior to that of the third comparison example.

A self-healing on the metallized films of the respective capacitors after the breakdown test will be explained with reference to FIG. 8A, FIG. 8B, FIG. 9A, and FIG. 9B.

Figure 9A:
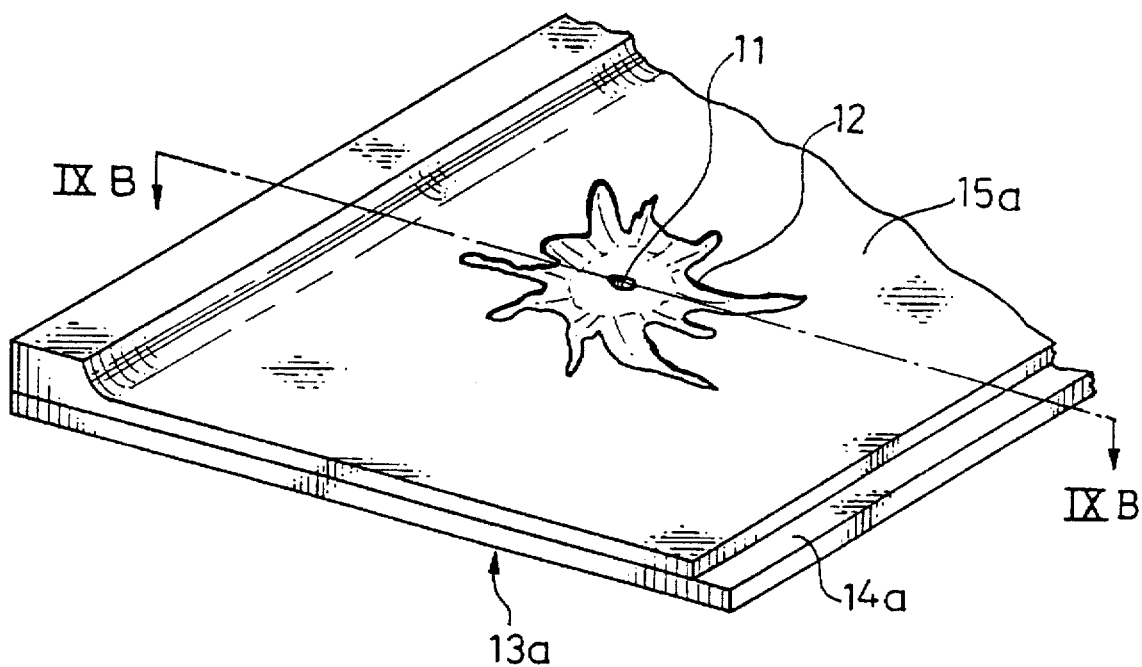
FIG. 9A is a perspective view showing the metallized film of the third comparison example after the breakdown test.
Figure 9B:
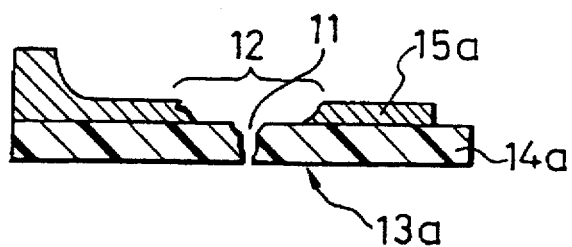
FIG. 9B is a cross sectional view, which is taken on line IXB—IXB of FIG. 9A, showing the metallized film of the third comparison example after the breakdown test.

FIG. 8A is a perspective view showing the metallized film of the first embodiment after the breakdown test. FIG. 8B is a cross sectional view, which is taken on line IIIVB—IIIVB of FIG. 8A, showing the metallized film of the first embodiment after the breakdown test. FIG. 9A is a perspective view showing the metallized film of the third comparison example after the breakdown test. FIG. 9B is a cross sectional view, which is taken on line IXB—IXB of FIG. 9A, showing the metallized film of the third comparison example after the breakdown test.

In order to confirm the self-healing, the inventors disassembled the respective capacitors after the breakdown test, and observed state of the metallized films.

As shown in FIG. 8A and FIG. 8B, a gentle and desirable self-healing part 10 is formed in the aluminum deposition film 5a above an insulation defect part 9. It is known that the insulation defect part 9 generates in the PET film 4a caused by an air bubble existing in the PET film 4a. When the test voltage is applied to the capacitor, the self-healing part 10 is formed by dispersion of the aluminum deposition film 5a above the insulation defect part 9 caused by short-circuit current.

As shown in FIG. 9A and FIG. 9B, a self-healing part 12 is formed largely in the zinc deposition film 15a above an insulation defect part 11.

Size of the self-healing part 10 in the aluminum deposition film 5a are smaller than those of the self-healing part 12 in the zinc deposition film 15a. That is, in the metallized film 3a of the first embodiment, the self-healing is appropriately performed, and thermal damage given to the PET film 4a by the short-circuit current is permissible. Therefore, it is considered that dielectric strength of the PET film 4a is almost recovered to an inherent dielectric strength of the PET film 4a.

On the contrary, in the metallized film 13a of the third comparison example, the self-healing is not gentle, and the zinc deposition film 15a is widely lost, and thermal damage given to the PET film 14a by the short-circuit current is excessive. Therefore, size of the insulation defect part 11 of the PET film 14a becomes larger than that of the insulation defect part 9 of the PET film 4a. Thus, in the case that the zinc deposition film 15a is formed on the PET film 14a, the self-healing is not appropriately performed. As a result, dielectric strength of the PET film 14a is not recovered to an inherent dielectric strength of the PET film 14a.

In the metallized film (not shown) of the first comparison example, size of a self-healing part are set smaller than those of the self-healing part 12 as well as those of the self-healing part 10. However, in the metallized film of the first comparison example, the aluminum deposition film adjacent to the metallikon part is dispersed and evaporated by the short-circuit current. Thereby, the capacitor element of the first comparison example is disconnected from the metallikon part, and capacitance of the capacitor element is lost. The reason why is that the resistivity of the aluminum deposition film is too large. Accordingly, in this first comparison example, there is no problem with regard to the breakdown voltage. However, in the first comparison example, there is a problem with regard to allowable maximum charge and discharge currents.

In the metallized film (not shown) of the second comparison example, size of a self-healing part become large similar to those of the third comparison example. Therefore, in the case that the resistivity of the aluminum deposition film is small, it is confirmed that the breakdown voltage can not be improved.

Figure 10:
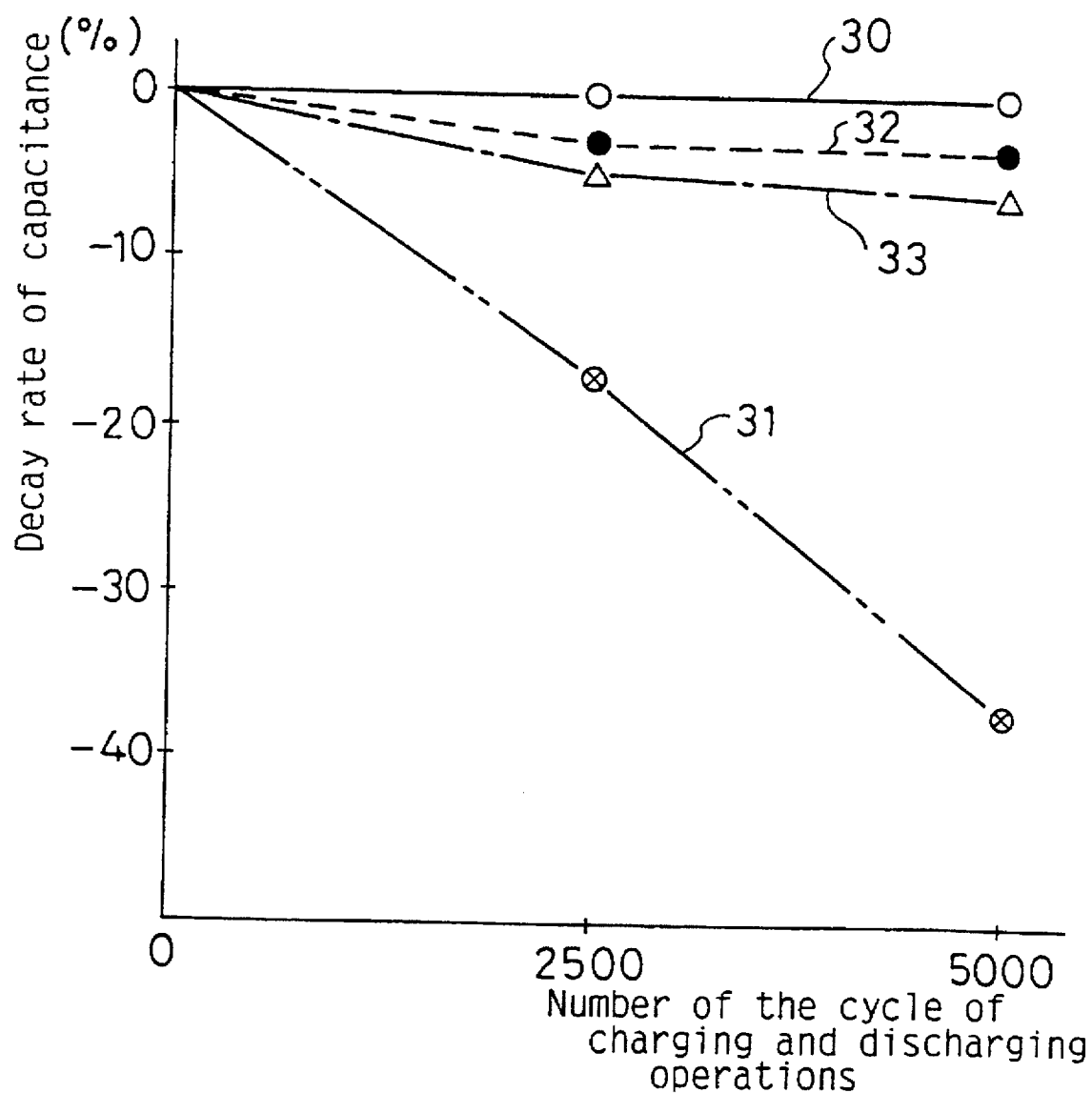
FIG. 10 is a graph showing test results of a charging and discharging test in the Comparative Investigation 1.

A charging and discharging test results in the Comparative Investigation 1 will be elucidated with reference to FIG. 10.

FIG. 10 is a graph showing test results of a charging and discharging test in the Comparative Investigation 1, wherein the abscissa is graduated with number of the cycle of charging and discharging operations, and the ordinate is graduated with decay rate of capacitance.

A main purpose of the charging and discharging test verifies the allowable maximum charge and discharge currents of the capacitors in the first embodiment, the first comparison example, the second comparison example, and the third comparison example.

Test conditions in the charging and discharging test are as follows:

(1) Temperature is 20°±15° C.
(2) Humidity is 50±20%.
(3) Applied voltage is 2500 V.
(4) Peak currents of a charging current and a discharging current are 200 A.
(5) Time of a discharging is 200 μsec.

In FIG. 10, a solid line 30 designates test results in the capacitor of the first embodiment, and a double-dashed chain line 31 designates test results in the capacitor of the first comparison example. Furthermore, a broken line 32 designates test results in the capacitor of the second comparison example, and a dashed line 33 designates test results in the capacitor of the third comparison example.

As shown in FIG. 10, decay rate of capacitance in the capacitor of the first embodiment is smallest, and decay rate of capacitance becomes smaller in order of the capacitors of the second, the third, and the first comparison examples. Furthermore, according to increase number of the cycle of charging and discharging operations, each differences of the test results is shown remarkably.

Hereafter, similar to the case of the breakdown test, in order to confirm the self-healing, the inventors disassembled the respective capacitors after the charging and discharging test, and observed state of the metallized films.

In the metallized film (not shown) of the first comparison example, the self-healing is fairly appropriately performed as well as the case of the breakdown test. However, the aluminum deposition film adjacent to the metallikon part is dispersed and evaporated by the short-circuit current though number of the self-healing part is few. Thereby, the capacitor element of the first comparison example is disconnected from the metallikon part, and capacitance of the capacitor element is lost. The reason is considered such that the resistivity of the aluminum deposition film is too large as well as the case of the breakdown test.

In the metallized film (not shown) of the second comparison example, a degree of dispersion of the aluminum deposition film adjacent to the metallikon part is smaller in comparison with that of the first comparison example. Therefore, decay of capacitance is smaller in comparison with that of the first comparison example. Similarly, in the metallized film (not shown) of the third comparison example, a degree of dispersion of the zinc deposition film adjacent to the metallikon part is smaller in comparison with that of the first comparison example. Therefore, decay of capacitance is smaller in comparison with that of the first comparison example.

However, in the metallized films of the second and the third comparison examples, number of the self-healing part is large, and the self-healing is not good. Furthermore, in the metallized films of the second and the third comparison examples, each size of the self-healing part is large.

In the metallized film 3a of the first embodiment, number of the self-healing part 10 is small, and size of the self-healing part 10 is smaller than that of other comparison examples.

In accordance with the test results of the breakdown test and the charging and discharging test, the respective capacitors in the first embodiment, and the first through the third comparison examples are designed with the following specifications (1)–(3) so as to have the same life characteristic.

(1) Rated voltage is 2400 V.
(2) Rated current is 100 A.
(3) Capacitance is 30 µF.

When each volume of the capacitors is calculated, a calculated value of the capacitor in the first embodiment is obtained smaller by about 25–30% in comparison with those of the capacitors in the first through the third comparison examples.

Thus, in the capacitor of the first embodiment, the two metallized films 3a, 3b (FIG. 2) comprise the aluminum deposition films 5a, 5b (FIG. 2) deposited on the PET films 4a, 4b (FIG. 2) as the main electrode part, respectively. In one edge part each of the PET films 4a, 4b, the zinc deposition films 6a, 6b are formed on the aluminum deposition films 5a, 5b, respectively, so that the heavy edge construction is formed by the aluminum deposition films 5a, 5b and the zinc deposition films 6a, 6b. Thereby, it is possible that the self-healing is appropriately performed, and size of the self-healing part 10 (FIGS. 8A and 8B) become small. As a result, each of dielectric strength of the PET films 4a, 4b can be recovered. It is possible to increase the electric potential gradient. Since the zinc deposition films 6a, 6b are used in the heavy edge construction, the allowable maximum charge and discharge currents can be increased.

As a result, in the capacitor of the first embodiment, it is possible to obtain the capacitor having superior life characteristic with small size and light weight.

<<COMPARATIVE INVESTIGATION 2>>

In a Comparative investigation 2, the capacitors of the aforementioned second and third embodiments are compared with a capacitor of a fourth comparison example in order to show the technical advantages of the capacitors of the second and third embodiments.

In the capacitor element of the second embodiment shown in FIGS. 4C and 4D, a resistivity of the respective aluminum deposition films 5a, 5b is adjusted to 8–30 Ω per square. A resistivity of the respective zinc deposition films 6a, 6b is adjusted to 1.5–7 Ω per square.

In the capacitor element of the third embodiment shown in FIG. 5, a resistivity of the respective aluminum deposition films is adjusted to 8–30 Ω per square. A resistivity of the respective zinc deposition films is adjusted to 1.5–7 Ω per square.

The capacitor of the fourth comparison example is constituted with seven capacitors, which are connected in series, of the first embodiment.

In this Comparative Investigation 2, thickness of each PET films 4a, 4b of the second embodiment, the third embodiment, and the fourth comparison example is 10 µm, and capacitance of each capacitors of the second embodiment, the third embodiment, and the fourth comparison example is 4.3 µF. Furthermore, rated voltage of each capacitors is 17000 V.

Calculation results of volume of each capacitors will be explained with reference to FIG. 11.

Figure 11:
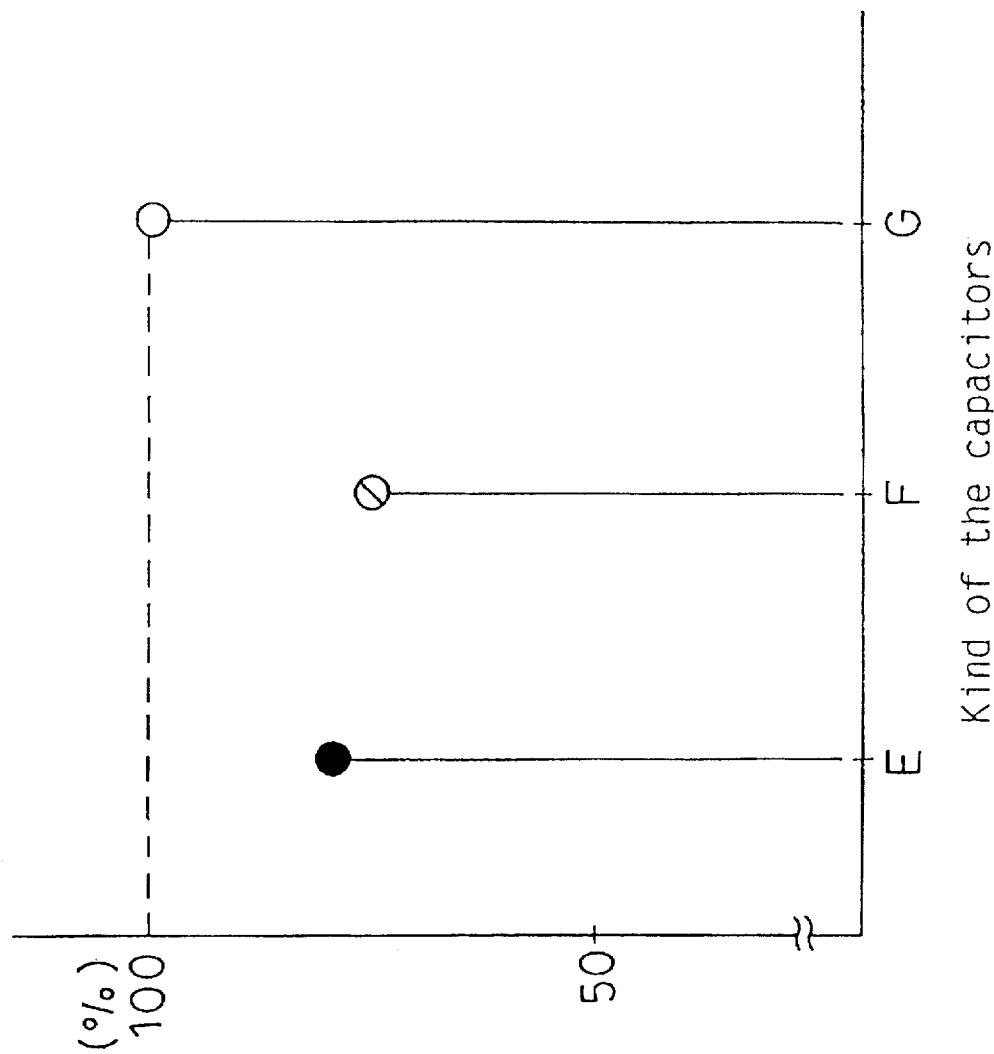
FIG. 11 is a graph showing a percentage for volume of the capacitor of the fourth comparison example.

FIG. 11 is a graph showing a percentage for volume of the capacitor of the fourth comparison example, wherein kind of the capacitors are represented on the abscissa, and the ordinate is graduated with a percentage for volume of the capacitor of the fourth comparison example. In the abscissa of FIG. 11, points "E", "F", and "G" on abscissa designate the capacitors of the second embodiment, the third embodiment, and the fourth comparison example, respectively.

The capacitor shown by the point "E" has a configuration elucidated in the second embodiment made by combining the metallized films 3a, 3b of FIG. 4C and FIG. 4D, a capacitance of 4.3 µF, and rated voltage of 17000 V.

The capacitor shown by the point "F" has a configuration elucidated in the third embodiment, a capacitance of 4.3 µF, and rated voltage of 17000 V.

The capacitor shown by the point "G" has a configuration elucidated with reference to FIGS. 1 to 3, a capacitance of 4.3 µF, and rated voltage of 17000 V.

As shown in FIG. 11, in the case that volume of the capacitor of the fourth comparison example is 100%, those of the second and the third embodiment are approximately 80% and 75%, respectively. That is, volumes of the second and the third embodiment are smaller by about 20–25% in comparison with that of the first embodiment. The reason why is that, in the capacitors of the second and the third embodiment, the capacitor elements are configured by the multiple elements series-connected capacitors. On the contrary, in the fourth comparison example, seven capacitors are connected in series. Thereby, in the fourth comparison example, lead wires and a part to be soldered are required in order to connect with the respective capacitors.

Test results of the breakdown test and the charging and discharging test in the Comparative Investigation 2 will be explained with reference to FIG. 12 and FIG. 13, respectively.

Figure 12:
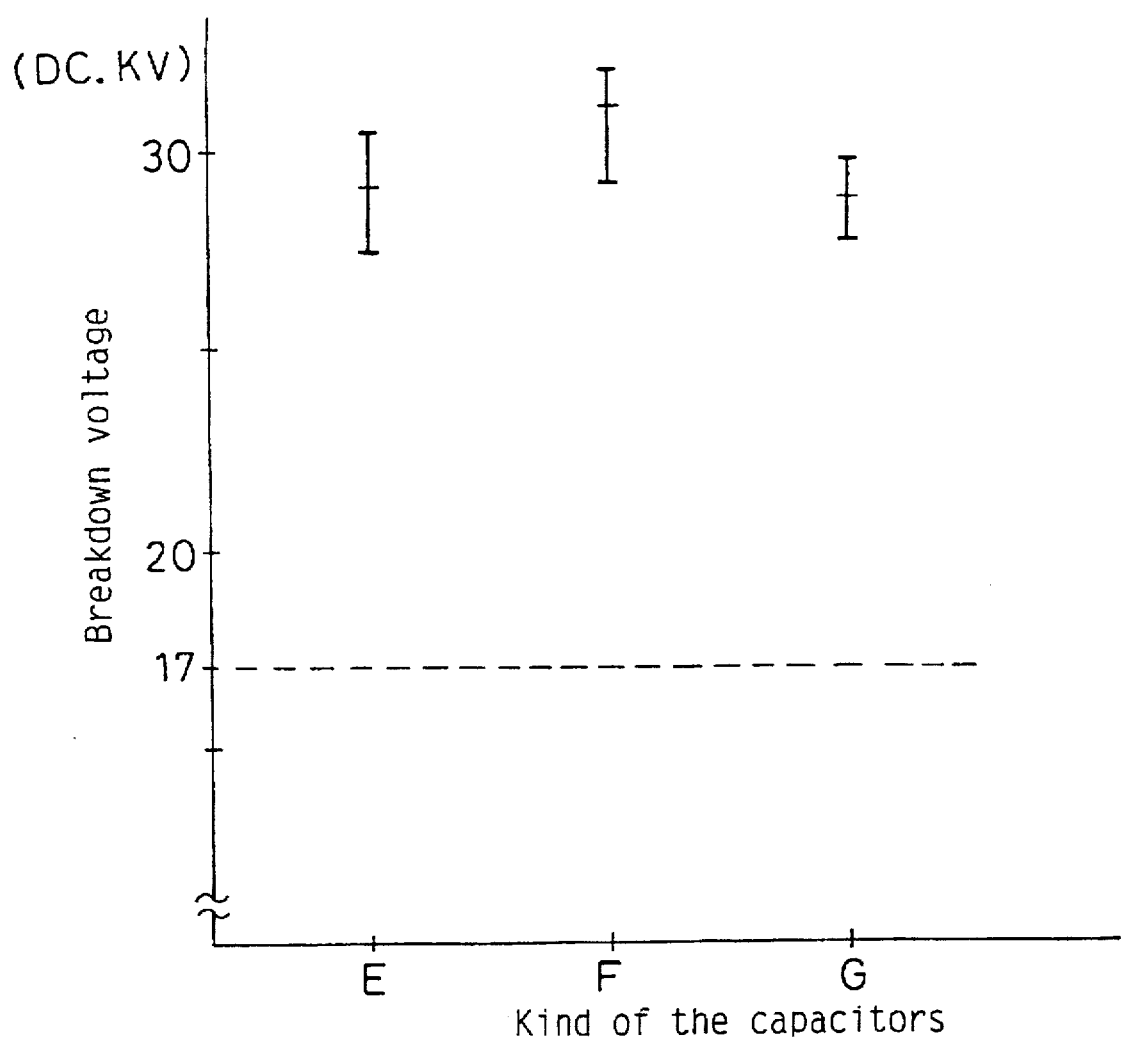
FIG. 12 is a graph showing test results of a breakdown test in a Comparative Investigation 2.

FIG. 12 is a graph showing test results of a breakdown test in a Comparative Investigation 2, wherein kind of the capacitors are represented on the abscissa, and the ordinate is graduated with a breakdown voltage. FIG. 13 is a graph showing test results of a charging and discharging test in the Comparative Investigation 2, wherein the abscissa is graduated with number of the cycle of charging and discharging operations, and the ordinate is graduated with decay rate of capacitance.

In the breakdown test and the charging and discharging test, test conditions are equal to those of the breakdown test and the charging and discharging test in the Comparative Investigation 1. in the abscissa of FIG. 12, points "E", "F", and "G" designate the same capacitors as designated and elucidated by the same marks on FIG. 11. In FIG. 13, a solid line 34 designates test results in the capacitor of the second embodiment, and a dashed line 35 designates test results in the capacitor of the third comparison example. Furthermore, a broken line 36 designates test results in the capacitor of the fourth comparison example.

Figure 13:
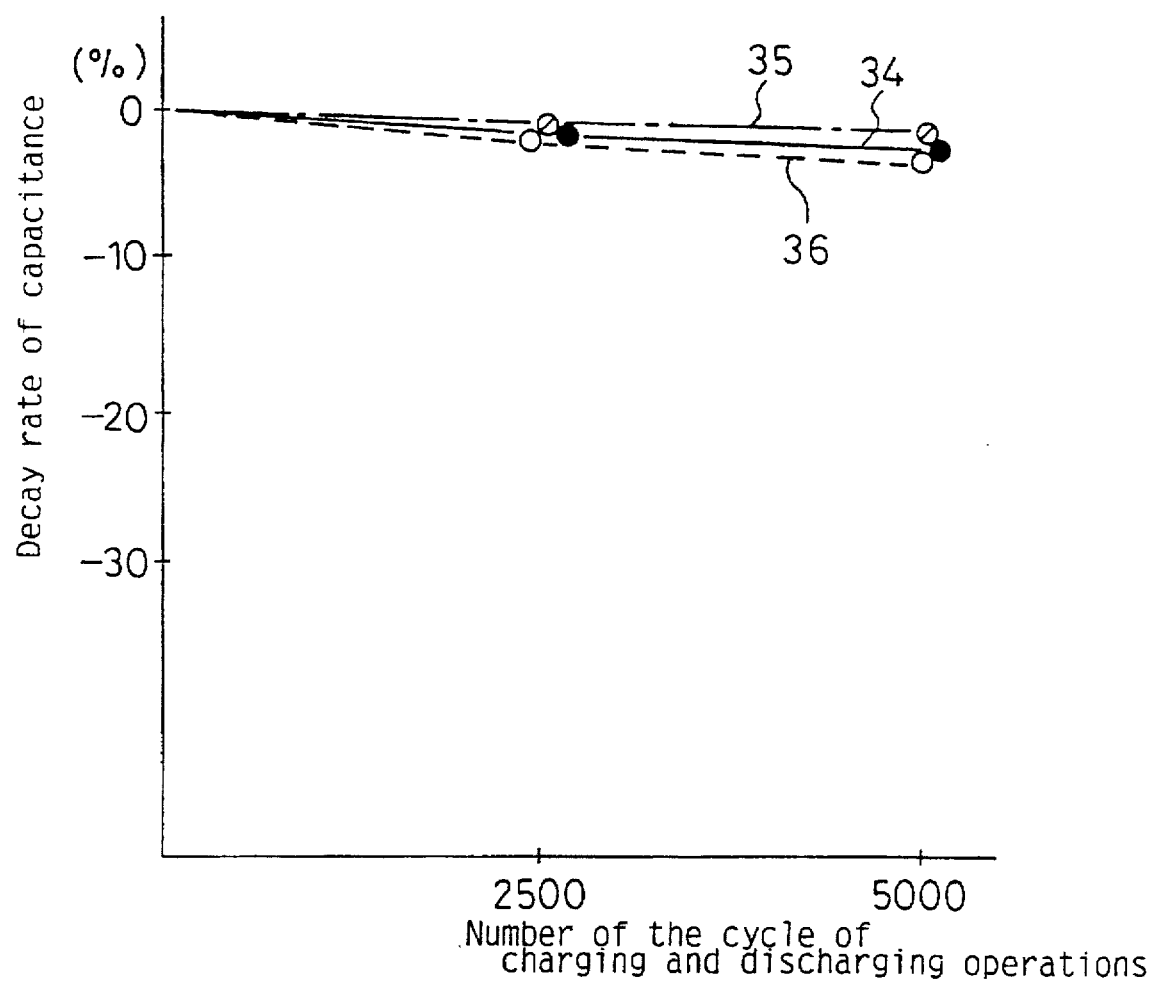
FIG. 13 is a graph showing test results of a charging and discharging test in the Comparative Investigation 2.

As shown in FIGS. 12 and 13, in both the breakdown test and the charging and discharging test, it is confirmed that satisfactory test results are shown in the respective capacitors of the second and the third embodiments and the fourth comparison example. In particular, test results of the third embodiment (shown by the dashed line 35 and point "F") are more superior in comparison with those of the second embodiment and the fourth comparison example. The reason why is that, in the third embodiment, the aluminum deposition films 5a1–5a4 and the zinc deposition film 6a are divided into plural pieces in the lengthwise direction as shown in FIG. 5. Thereby, in the third embodiment, it is possible to suppress the short-circuit current. As a result, size of the self-healing part are made smaller than those of the second embodiment and the fourth comparison example.

In the capacitors of the second and the third embodiment, the aluminum deposition films 5a, 5b are divided into plural pieces in the widthwise direction as shown in FIGS. 4C and 4D. When the first metallized film 3a is put on the second metallized film 3b, the gap on the first metallized film 3a and the gap on the second metallized film 3b are disposed in staggered relation. Thereby, multiple elements series-connected capacitors are formed in the capacitor element 1. As a result, even if the capacitor having a large rated voltage is formed, it is possible to make the capacitor small.

Furthermore, in the third embodiment, the aluminum deposition films 5a1–5a4 and the zinc deposition film 6a are divided into plural pieces in the lengthwise direction as shown in FIG. 5. Thereby, it is possible to suppress the short-circuit current. As a result, it is possible that size of the self-healing part are made smaller. Furthermore, it is possible to increase dielectric strength of the PET films 4a, 4b.

<<COMPARATIVE INVESTIGATION 3 >>

[Comparative Investigation 3-A]

In a Comparative Investigation 3-A, nine types of capacitors (A) each having different resistivity of the respective aluminum deposition films 5a, 5b of FIG. 2 are prepared. All the nine types of capacitors (A) have a configuration elucidated in the first embodiment made by the capacitor element 1 of FIG. 2, and for all the nine types of capacitors (A) the resistivity of the respective zinc deposition films 6a, 6b is set to 3 Ω per square. In the resistivity of the respective aluminum deposition films 5a, 5b, the nine types of capacitors (A) are adjusted to 3, 5, 8, 10, 12, 20, 30, 35, and 40 Ω per square, respectively. Each of the nine types of capacitors (A) is contained in the casing equipped with the internal pressure detecting device. Furthermore, each of the metallikon parts 2a, 2b (FIG. 1) is connected with the electrode terminal, and the inside of the casing is filled with the polybutene oil.

In all the nine types of capacitors (A), thickness of each PET films 4a, 4b (FIG. 2) is 10 μm, and capacitance of each capacitors is 30 μF.

Figure 14:
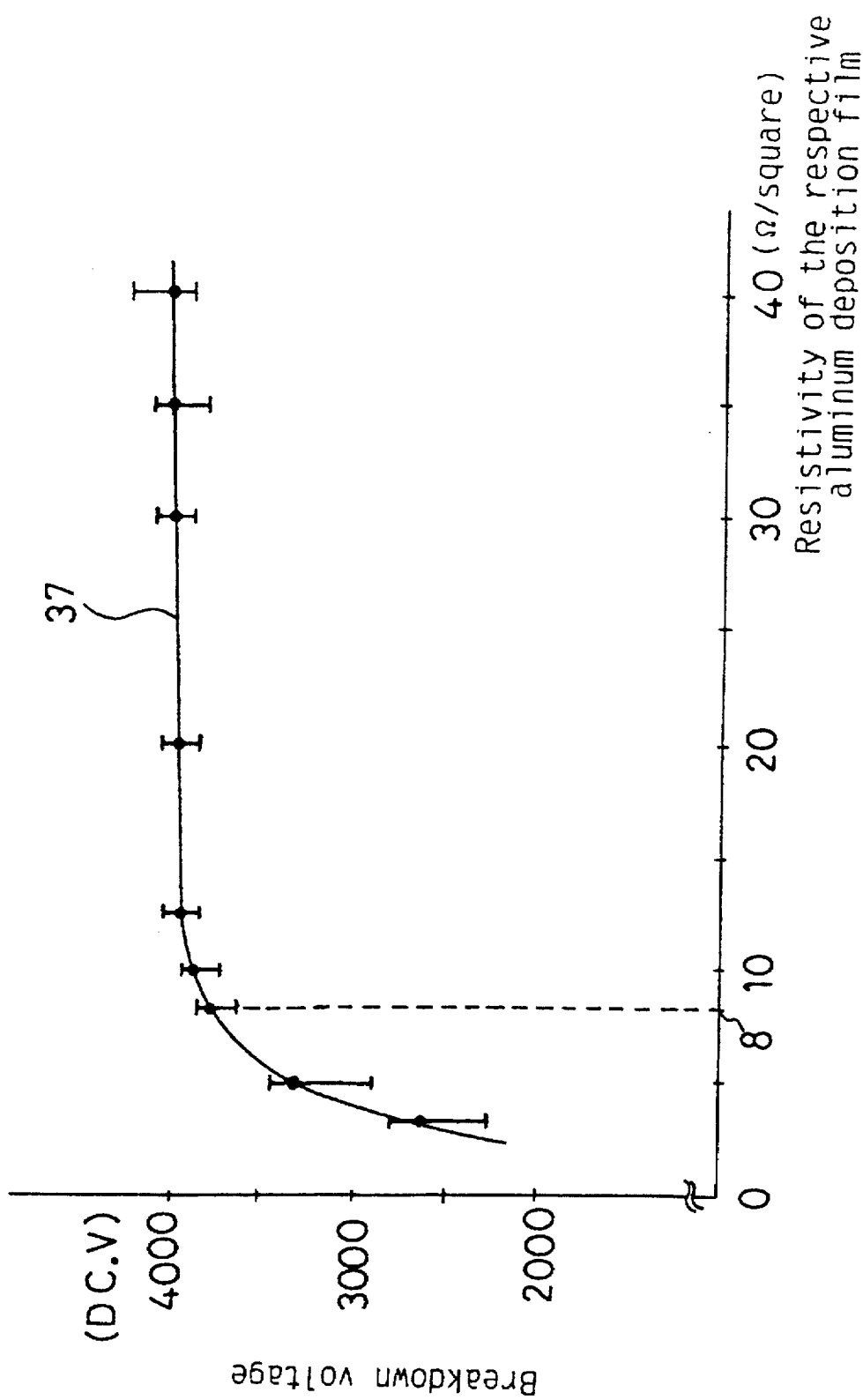
FIG. 14 is a graph showing test results of the breakdown test in nine types of capacitors (A).

The breakdown test result in the nine types of capacitors (A) will be elucidated with reference to FIG. 14.

FIG. 14 is a graph showing test results of the breakdown test in nine types of capacitors (A), wherein the abscissa is graduated with the resistivity of the respective aluminum deposition films, and the ordinate is graduated with the breakdown voltage.

In order to obtain average value of the breakdown voltage in the nine types of capacitors (A), the breakdown test is performed for ten capacitors. In the breakdown test, test voltages are applied to respective capacitors. The test voltages are increased with a predetermined rate until breakdown occurs in each capacitor.

Furthermore, test conditions in the breakdown test are as follows:
(1) Temperature is 20°±15° C.
(2) Humidity is 50±20%.
(3) An increasing rate of the test voltage is 100 V per minute.

As shown in a solid line 37 of FIG. 14, the breakdown voltage is changed in accordance with the resistivity of the respective aluminum deposition films 5a, 5b. In the case that the resistivity of the respective aluminum deposition films 5a, 5b is under 8 Ω per square, the breakdown voltage is low, and increases responding to increase of the resistivity of the respective aluminum deposition films 5a, 5b.

In the case that the resistivity of the respective aluminum deposition films 5a, 5b is in a range between 8 and 12 Ω per square, the breakdown voltage goes up gently. Furthermore, in the case that the resistivity of the respective aluminum deposition films 5a, 5b is in a range between 12 and 40 Ω per square, the breakdown voltage takes a constant value.

Thus, in order to stably obtain high average value of the breakdown voltage, it is necessary that the resistivity of the respective aluminum deposition films 5a, 5b is adjusted to 8 Ω per square or further.

Figure 15:
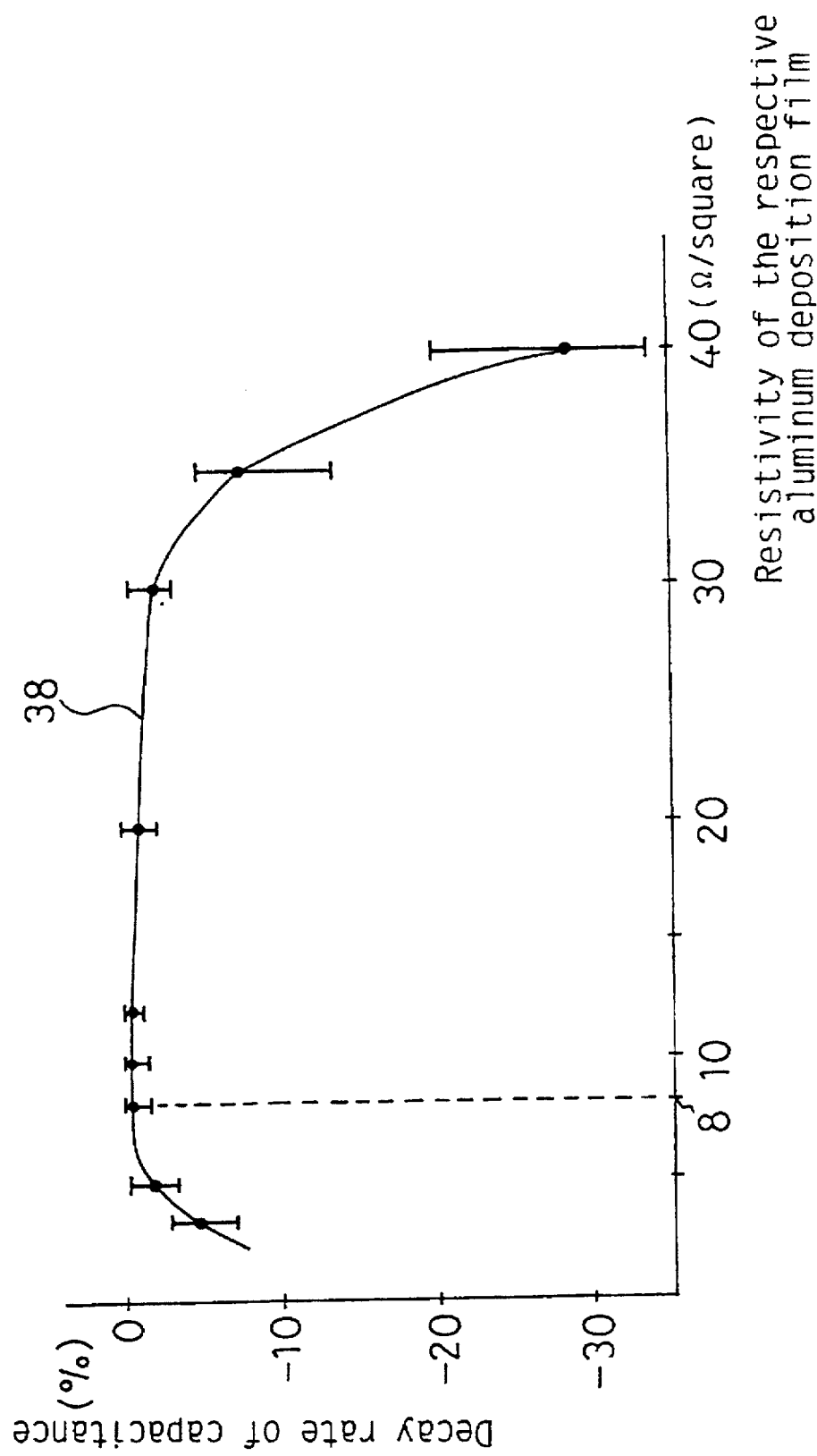
FIG. 15 is a graph showing test results of the charging and discharging test in the nine types of capacitors (A).

Elucidation is made on the charging and discharging test results for the nine types of capacitors (A) with reference to FIG. 15.

FIG. 15 is a graph showing test results of the charging and discharging test in the nine types of capacitors (A), wherein the abscissa is graduated with the resistivity of the respective aluminum deposition films, and the ordinate is graduated with decay rate of capacitance.

In order to confirm the allowable maximum charge and discharge currents of the nine types of capacitors (A), the charging and discharging test is performed for ten capacitors for every nine types of capacitors (A). As the value of decay rate of each capacitors, the decay rate at the 2500 times of the charging and discharging operations is used.

Furthermore, test conditions in the charging and discharging test are as follows:
(1) Applied voltage is 2500 V.
(2) Peak currents of a charging current and a discharging current are 200 A.
(3) Time of a discharging is 200 μsec.

As shown in a solid line 38 of FIG. 15, in the case that the resistivity of the respective aluminum deposition films 5a, 5b is under 8 Ω per square, the value of decay rate of capacitance is small value.

In the case that the resistivity of the respective aluminum deposition films 5a, 5b exists in a range between 8 and 30 Ω per square, the value of decay rate of capacitance stably exists in a range between 1 and 2%. Furthermore, in the case that the resistivity of the respective aluminum deposition films 5a, 5b is over 30 Ω per square, the value of decay rate of capacitance becomes larger responding to increase of the resistivity of the respective aluminum deposition films 5a, 5b. That is, in the case that the resistivity of the respective aluminum deposition films 5a, 5b is over 30 Ω per square, it is confirmed that the allowable maximum charge and discharge currents are reduced.

Furthermore, in order to confirm the self-healing, the inventors disassembled the respective capacitors after the charging and discharging test, and observed state of the metallized films 3a, 3b (FIG. 2).

The observation confirmed that when the resistivity of the respective aluminum deposition films 5a, 5b exists in a range between 8 and 30 Ω per square, the self-healing is appropriately performed. Furthermore, dispersion of the respective aluminum deposition films 5a, 5b is performed gently and desirably. In the case that the resistivity of the respective aluminum deposition films 5a, 5b is under 8 Ω per square, size of the self-healing part 10 (FIGS. 8A and 8B) was larger. Furthermore, dispersion of the respective aluminum deposition films 5a, 5b is performed larger.

In the case that the resistivity of the respective aluminum deposition films 5a, 5b is over 30 Ω per square, the self-healing is appropriately performed. However, in the self-healing part 10, the respective aluminum deposition films 5a, 5b are further dispersed and evaporated. Since thicknesses of the respective aluminum deposition films 5a, 5b are thin, dispersion of the respective aluminum deposition films 5a, 5b is expanded by corona discharging every flowing of the short-circuit current. Thereby, it is assumed that the capacitance is decreased largely.

Thus, in the case that the resistivity of the respective aluminum deposition films 5a, 5b exists in a range between 8 and 30 Ω per square, it is possible to satisfy the breakdown voltage and the allowable maximum charge and discharge currents.

[Comparative Investigation 3-B]

In a Comparative Investigation 3-B, eight types of capacitors (B) each having different resistivity of the respective zinc deposition films 6a, 6b of FIG. 2 are prepared. All the eight types of capacitors (B) have a configuration elucidated in the first embodiment made by the capacitor element 1 of FIG. 2, and for all the eight types of capacitors (B) the resistivity of the respective aluminum deposition films 5a, 5b is set to 15 Ω per square. In the resistivity of the respective zinc deposition films 6a, 6b, the eight types of capacitors (B) are adjusted to 1, 1.5, 2, 3, 5, 7, 8, and 9 Ω per square, respectively. Each of the eight types of capacitors (B) is contained in the casing equipped with the internal pressure detecting device. Furthermore, each of the metallikon parts 2a, 2b (FIG. 1) is connected with the electrode terminal, and the inside of the casing is filled with the polybutene oil.

In all the eight types of capacitors (B), thickness of each PET films 4a, 4b (FIG. 2) is 10 μm, and capacitance of each capacitors is 30 μF.

Figure 16:
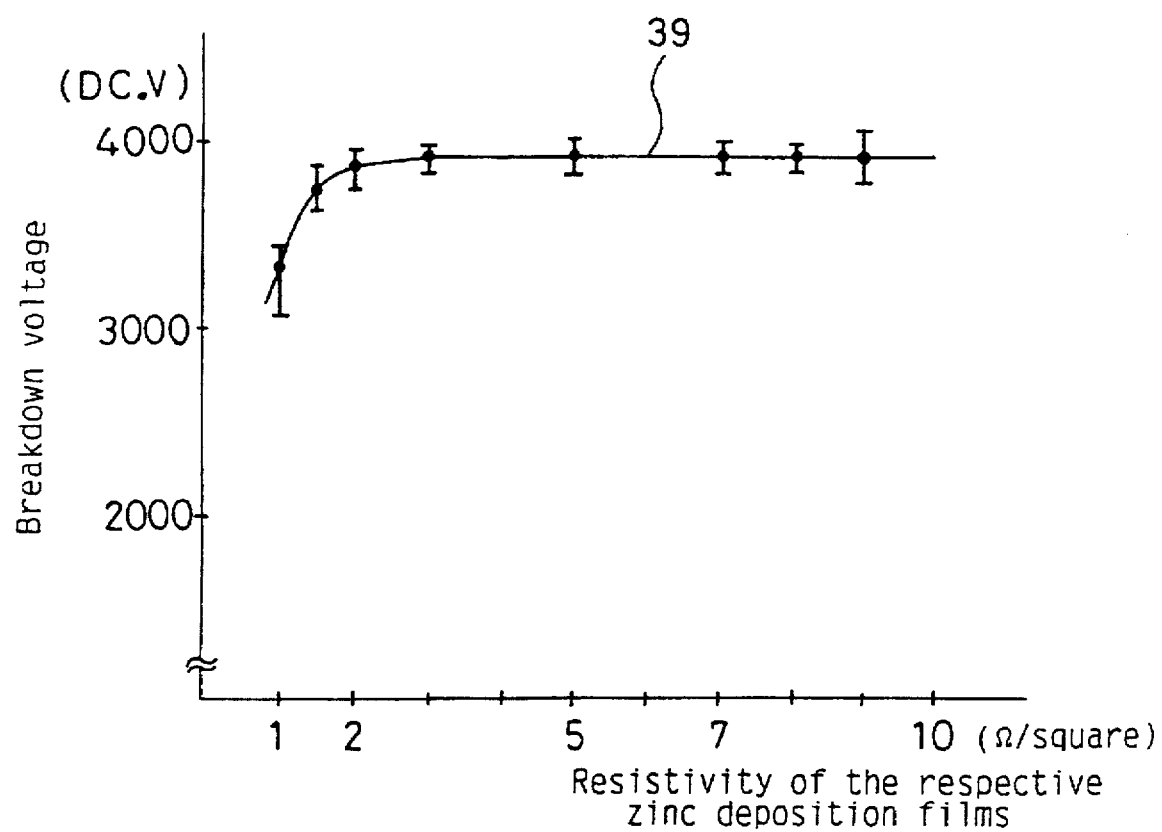
FIG. 16 is a graph showing test results of the breakdown test in eight types of capacitors (B).

The breakdown test result in the eight types of capacitors (B) will be elucidated with reference to FIG. 16.

FIG. 16 is a graph showing test results of the breakdown test in eight types of capacitors (B), wherein the abscissa is graduated with the resistivity of the respective zinc deposition films, and the ordinate is graduated with the breakdown voltage.

In order to obtain average value of the breakdown voltage in the eight types of capacitors (B), the breakdown test is performed for ten capacitors. In the breakdown test, test voltages are applied to respective capacitors, and the test voltages are increased with a predetermined rate until breakdown occurs in each capacitor.

Furthermore, test conditions in the breakdown test are as follows:

(1) Temperature is 20°±15° C.
(2) Humidity is 50±20%.
(3) An increasing rate of the test voltage is 100 V per minute.

As shown in a solid line 39 of FIG. 16, in the case that the resistivity of the respective zinc deposition films 6a, 6b is 1 Ω per square, the breakdown voltage is smaller hundreds volt in comparison with that of other capacitors.

In the case that the resistivity of the respective zinc deposition films 6a, 6b is 1.5 Ω per square or further, the breakdown voltage takes a high constant value stably.

In order to confirm the self-healing, the inventors disassembled the respective capacitors after the breakdown test, and observed state of the metallized films 3a, 3b (FIG. 2). As a result, in the case that the resistivity of the respective zinc deposition films 6a, 6b is 1 Ω per square, a large destructive part is formed in the respective zinc deposition films 6a, 6b. Since thicknesses of the respective zinc deposition films 6a, 6b are too thick, it is impossible that the self-healing is appropriately performed. In the case that the resistivity of the respective zinc deposition films 6a, 6b is 1.5 Ω per square or further, the self-healing is appropriately performed.

Figure 17:
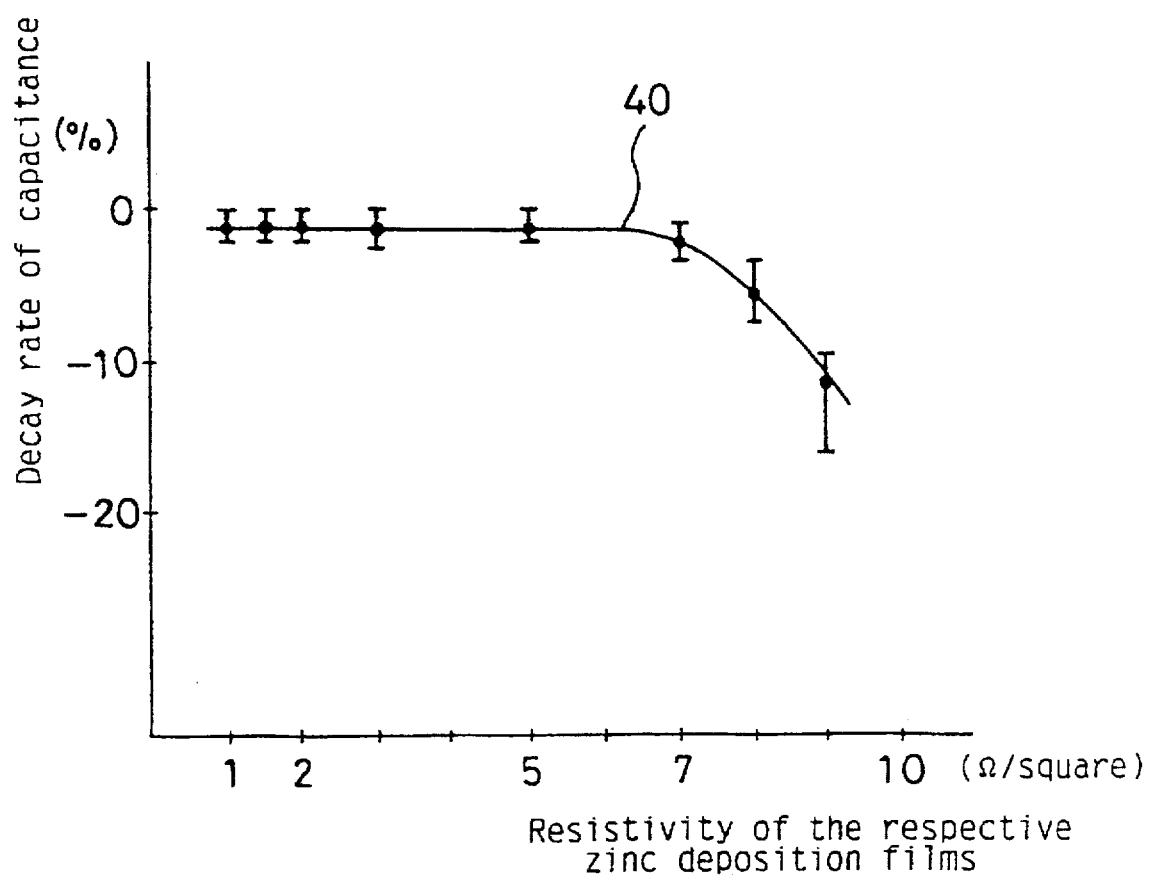
FIG. 17 is a graph showing test results of the charging and discharging test in the eight types of capacitors (B).

The charging and discharging test results in the eight types of capacitors (B) will be elucidated with reference to FIG. 17.

FIG. 17 is a graph showing test results of the charging and discharging test in the eight types of capacitors (B), wherein the abscissa is graduated with the resistivity of the respective zinc deposition films, and the ordinate is graduated with decay rate of capacitance.

In order to confirm the allowable maximum charge and discharge currents of each eight types of capacitors (B), the charging and discharging test is performed for ten capacitors for every eight types of capacitors (B). As the value of decay rate of each capacitors, the decay rate at the 2500 times of charging and discharging operations is used.

Furthermore, test conditions in the charging and discharging test are as follows:

(1) Applied voltage is 2500 V.
(2) Peak currents of a charging current and a discharging current are 200 A.
(3) Time of a discharging is 200 μsec.

As shown in a solid line 40 of FIG. 17, in the case that the resistivity of the respective zinc deposition films 6a, 6b exists in a range between 1 and 7 Ω per square, the value of decay rate of capacitance is small value stably.

In the case that the resistivity of the respective zinc deposition films 6a, 6b is over 7 Ω per square, the value of decay rate of capacitance becomes large.

Furthermore, in order to confirm the self-healing, the inventors disassembled the respective capacitors after the charging and discharging test, and observed state of the metallized films.

The observation confirmed that when the resistivity of the respective zinc deposition films 6a, 6b is over 7 Ω per square, dispersion of each zinc deposition films 6a, 6b is formed. Since the resistivity of the respective zinc deposition films 6a, 6b is large, the allowable maximum charge and discharge currents are reduced. Furthermore, the respective zinc deposition films 6a, 6b is dispersed and evaporated by flowing of current.

Thus, in the case that the resistivity of the respective zinc deposition films 6a, 6b exists in a range between 1.5 and 7 Ω per square, it is possible to satisfy the breakdown voltage and the allowable maximum charge and discharge currents.

As has been described in the above, the resistivity of the respective zinc deposition films 6a, 6b is adjusted to a range between 1.5 and 7 Ω per square. Thereby, it is possible to prevent dispersion of the respective zinc deposition films 6a, 6b, and decrease of the allowable maximum charge and discharge currents. Furthermore, the resistivity of the respective aluminum deposition films 5a, 5b is adjusted to a range between 8 and 30 Ω per square. Thereby, it is possible that size of the self-healing part 10 become small. As a result, it is possible to increase dielectric strength of the capacitor.

In order to improve a moisture (or humid) proof characteristic of the zinc deposition film, it is known that a mixed (alloy) deposition film of zinc and aluminum is used instead of the zinc deposition film. In the capacitor of the present invention, the aluminum deposition film is formed on the PET film, and the zinc deposition film is formed on the aluminum deposition film on the side of one edge part of the PET film. That is, with regard to the double deposition film formed on the PET film, there is difference between the capacitor of the present invention and the conventional capacitor of the mixed deposition film.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A capacitor comprising:
   a wound-together roll of two oblong metallized films, with said metallized films overlapping each other, wherein:
   each of said two metallized films has an oblong plastic film, an aluminum deposition film formed on said plastic film, and a band of zinc deposition film formed along an edge of said aluminum deposition film; and
   a first of said two metallized films has said band of zinc deposition film disposed on one side edge of said oblong plastic film of said first metallized film and extending in a lengthwise direction and a second of said two metallized films has said band of zinc deposition film disposed on one side edge of said oblong plastic film of said second metallized film opposite said one side edge of said first metallized film and extending in said lengthwise direction.

2. The capacitor in accordance with claim 1, wherein said aluminum deposition film is divided into a plurality of oblong pieces by oblong parting gaps spaced apart in a widthwise direction and extending in a lengthwise direction, said oblong parting gaps of one of said two metallized films being disposed between respective oblong parting gaps of the other of said two metallized films so that widthwise plane sections of said oblong parting gaps are disposed in a staggered manner.

3. The capacitor according to claim 2, wherein said aluminum deposition film and said zinc deposition film of at least one of said two metallized films are divided into a plurality of pieces in a lengthwise direction of said two metallized films.

4. The capacitor according to claim 1, wherein a value of resistivity of said aluminum deposition film is within a range of about 8 ohms to about 30 ohms per square, and a value of resistivity of said zinc deposition film is within a range of about 1.5 ohms to about 7 ohms per square.

* * * * *